(12) United States Patent
Chan

(10) Patent No.: US 8,092,847 B2
(45) Date of Patent: Jan. 10, 2012

(54) CANDY PRODUCT AND METHOD OF MAKING SAME

(76) Inventor: Pak Nin Chan, Kowloon (HK)

( * ) Notice: Subject to any disclaimer, the term of this patent is extended or adjusted under 35 U.S.C. 154(b) by 867 days.

(21) Appl. No.: 11/644,330

(22) Filed: Dec. 22, 2006

(65) Prior Publication Data

US 2008/0152766 A1 Jun. 26, 2008

(51) Int. Cl.
*B65D 85/20* (2006.01)
*B65D 85/60* (2006.01)
*B65D 85/72* (2006.01)

(52) U.S. Cl. ............. 426/110; 206/219; 220/258.1; 220/258.3; 220/258.5; 222/153.05; 222/212; 222/525; 426/104; 426/115; 426/120; 426/134

(58) Field of Classification Search ............ 426/104, 426/115, 120, 134; 206/219; 222/153.05, 222/212, 525; 220/258.1, 258.3, 258.5
See application file for complete search history.

(56) References Cited

U.S. PATENT DOCUMENTS

| | | | |
|---|---|---|---|
| 4,229,482 A | 10/1980 | Kreske, Jr. | |
| RE35,577 E | 8/1997 | Coleman | |
| 2003/0035866 A1 | 2/2003 | Chan | |
| 2003/0082279 A1 | 5/2003 | Chan | |
| 2004/0037923 A1 | 2/2004 | Chan | |
| 2005/0142256 A1 | 6/2005 | Chan | |
| 2006/0040019 A1* | 2/2006 | Cecere | 426/85 |

* cited by examiner

*Primary Examiner* — Brent O'Hern
(74) *Attorney, Agent, or Firm* — Kilpatrick Townsend & Stockton LLP.

(57) ABSTRACT

A body (60) of hard candy is formed on a tubular stem (32) that extends from a reservoir/handle (12) in which an edible fluid (72) is contained. The outer end (36) of the tubular passageway (32) is open. A cover (70) is provided. It has an open end (71) which engages a base wall (40) and holds the cover (70) to the base wall (40). The cover (70) includes an end wall (74) which includes a plug (78) which enters into the end (60) of the tubular stem (32) when the cover (70) is installed. When the cover (70) is removed, a consumer may lick the candy (70) and may squeeze the reservoir/handle (12) to express edible fluid (72) out from the reservoir/handle (12), through the passageway (32) and into the consumer's mouth.

4 Claims, 5 Drawing Sheets

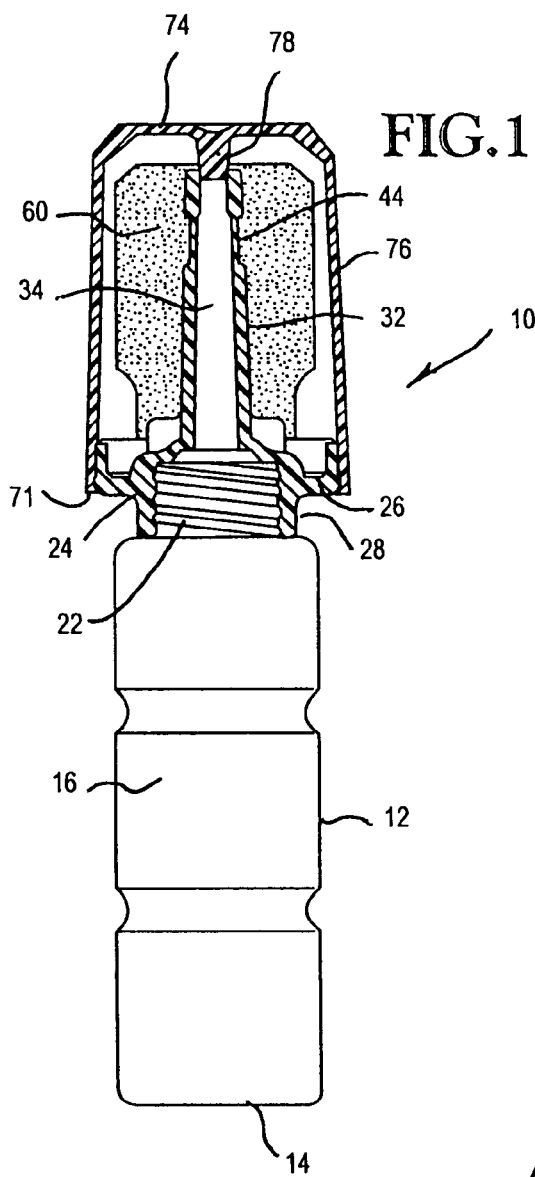
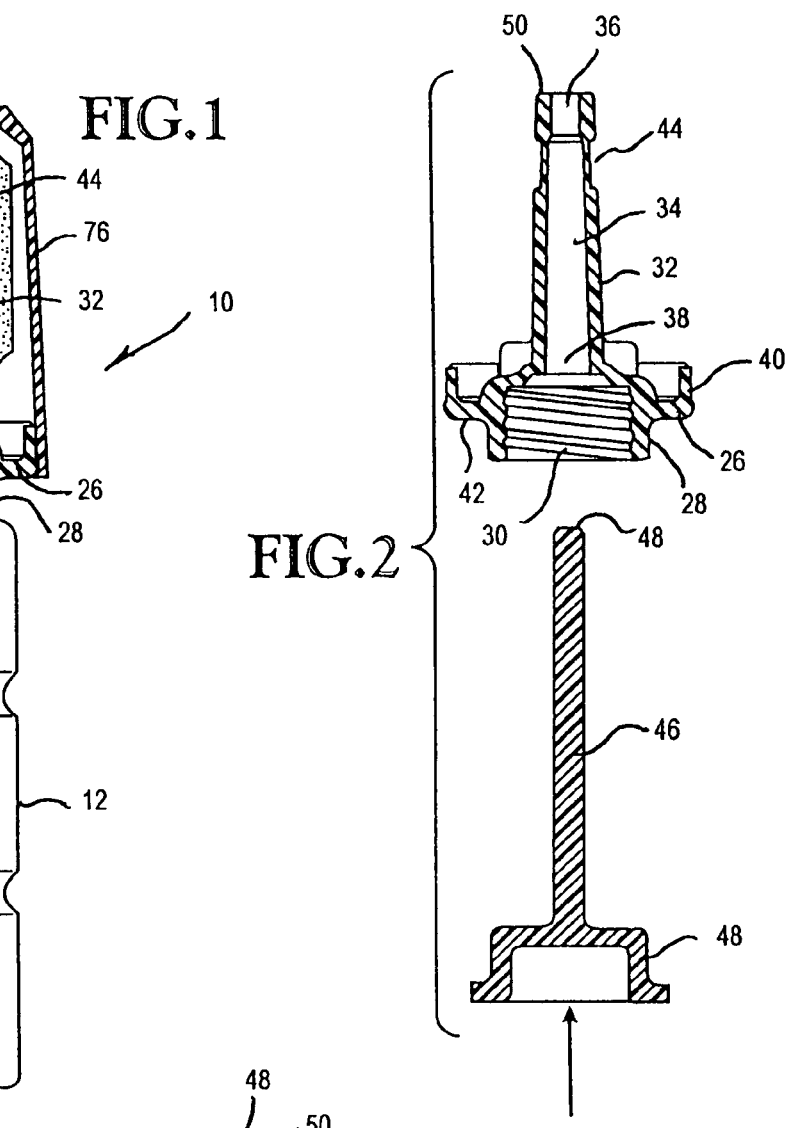
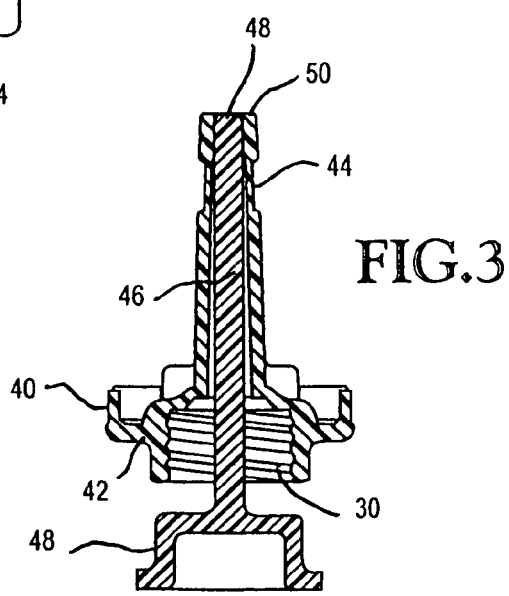

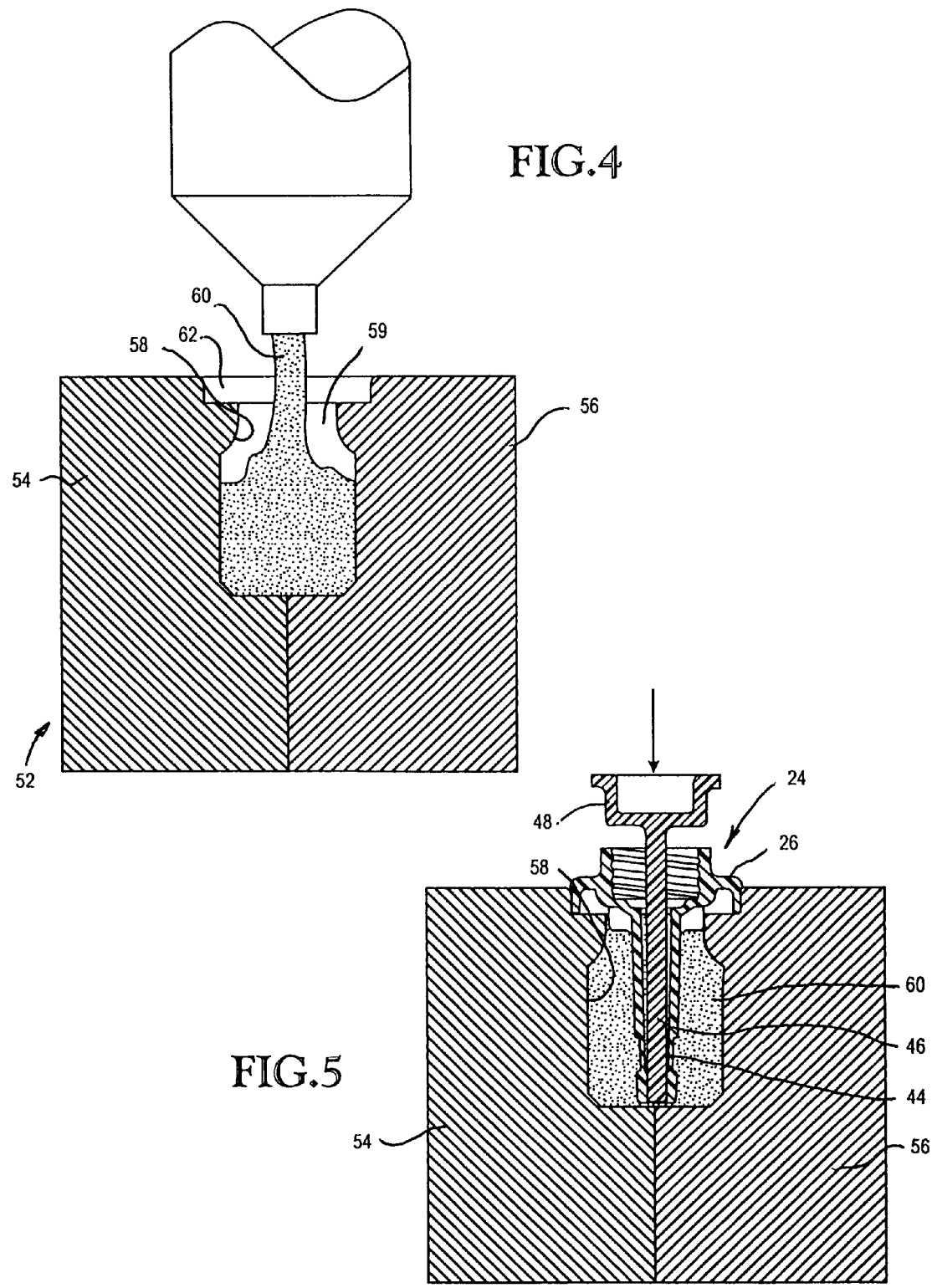

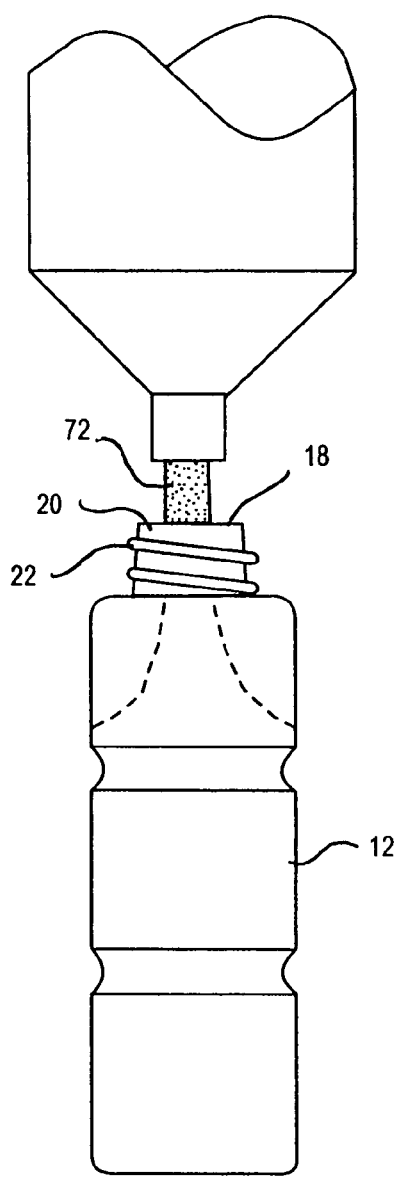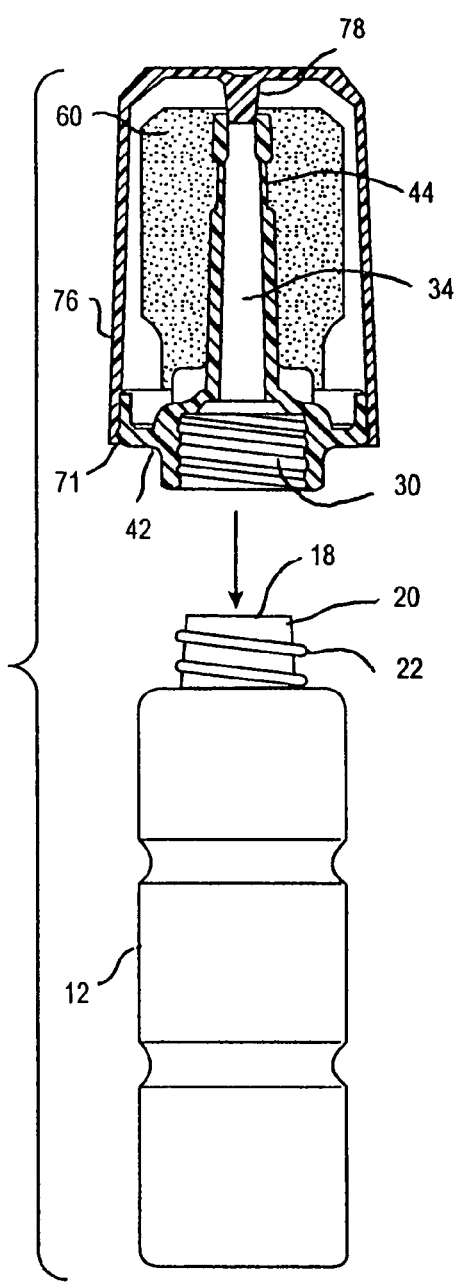

CANDY PRODUCT AND METHOD OF MAKING SAME

TECHNICAL FIELD

This invention relates to a candy product and to a method of making the candy product. More particularly, it relates to a candy product that includes a harden body of candy on a tubular stem having a center passageway though which an edible fluid is dispensed, and a cover for the body of candy that includes a closure plug for the outlet of the center passageway.

BACKGROUND OF THE INVENTION

This invention is an improvement on the candy products and methods disclosed by my U.S. Pat. No. 6,730,339, granted May 4, 2004, by my pending application Ser. No. 10/242,198, filed Sep. 12, 2002, and by my pending application Ser. No. 10/647,150, filed Aug. 25, 2003. As stated in my patent and applications, in recent years there has been a substantial increase in novelty candy products that are designed, at least primarily, to appeal to children. A number of these products are variations on the traditional concept of a lollipop.

Lollipops that are provided with an edible fluid in addition to a hard candy body are disclosed by U.S. Pat. No. 4,229,482, granted Oct. 21, 1980, to A. Kreske, Jr., and by U.S. Pat. No. Re. 35,577, reissued Aug. 5, 1997, to T. J. Coleman. A missing feature from the prior art candy products, and from the candy products disclosed in my patent and pending applications, is the ability to cover the hard body of candy and at the same time close the passageway through which the edible fluid is dispensed. The principal object of the present invention is to fill this need.

BRIEF SUMMARY OF THE INVENTION

The candy product of the invention comprises a container containing an edible fluid and having an outlet passageway in the elongated tubular stem. A solid body of candy is formed on the elongated tubular stem and the discharge end of the stem being clear of candy. A cover is provided for the solid body of candy. It includes an open end, a closed end and a sidewall extending between the open and closed ends. The closed end includes a plug. When the cover is removed, edible fluid can flow outwardly from the container to and through the elongated tubular stem. When the cover is installed, over the solid body of candy, the plug is inside of and forms a closure for the outlet of the tubular stem.

In preferred form, the elongated tubular member is connected to a base that includes a peripheral wall. When the cover is installed, its open end engages the peripheral wall of the base member when the plug is inside the outlet for the elongated tubular member.

In the preferred embodiment, the base member includes a central opening with internal threads and the container has a neck portion with external threads for receiving the internal threads. This allows the base member to be screwed onto the container.

The method of the invention comprises providing a holder having a cup-shaped portion, and a tubular stem portion projecting from said cup-shaped portion. A pin is inserted into said holder through said cup-shaped portion and said tubular stem portion. The pin is moved through the tubular stem portion until the end of the pin is substantially flush with the end of the tubular stem portion. A mold is provided which includes a mold cavity. Liquid candy is introduced into the mold cavity. Then, the holder and pin assembly is inserted into the liquid candy in the mold cavity. The candy is allowed to harden so as to anchor the candy to the tubular portion of the holder. Then, the hardened candy and holder are removed from the mold. Next, the pin is pushed to move it endwise through any candy wall that might have covered the outer end of the tubular portion. Then, the pin is removed from the holder, leaving an open passageway that extends through the holder and tubular stem. A container is provided that is closed except for an open end. An edible fluid is introduced through the open end into the container. The cup-shaped portion of the holder is attached to the open end of the container, putting the passageway in the tubular stem in liquid fluid-receiving communication with the interior of the container. A cover is provided that has an open end, a closed end including an inwardly projecting plug, and a sidewall extending from the closed end to the open end. The cover is positioned over the hardened candy and the open end of the cover is connected to the cup-shaped portion of the holder. In the process, the plug on the closed end of the cover is moved into the outer end of the tubular stem portion of the holder, so as to provide a closure for the tubular stem portion.

Preferably, the container is sized and shaped to receive the hand of a consumer and serve as a handle for the candy product.

Other objects, advantages and features of the invention will become apparent from the illustrated embodiment, from the description of the illustrated embodiment, set fourth below, from the claims, and from the principles that are embodied in the specific structures that are illustrated and described.

BRIEF DESCRIPTION OF THE SEVERAL VIEWS OF THE DRAWINGS

Like reference numerals are used to designate like parts throughout the several view of the drawing, and;

FIG. 1 is a view that is part elevation and part longitudinal section, looking toward a candy product that constructed according to the present invention;

FIG. 2 is an exploded longitudinal sectional view taken through a candy holder that is connectable to the upper end of a reservoir/handle, showing a pin member that is insertable into a tubular passageway portion of the holder during an early stage of manufacture of the candy product;

FIG. 3 is an assembled view of the candy holder and pin shown by FIG. 2;

FIG. 4 is a vertical sectional view through a mold cavity in a two-part mold, showing an edible food product being introduced into the mold cavity;

FIG. 5 is a view like FIG. 4, but showing the assembly of FIG. 3 inverted and the tubular passageway portion of the candy holder in the mold cavity;

FIG. 9 is an elevational view showing an edible fluid being introduced into the reservoir/handle;

FIG. 10 is a view like FIG. 9, but showing the assembly of FIG. 8 being spaced from a position of connection to the reservoir/handle;

DETAILED DESCRIPTION OF THE ILLUSTRATED EMBODIMENT

Figure 11:
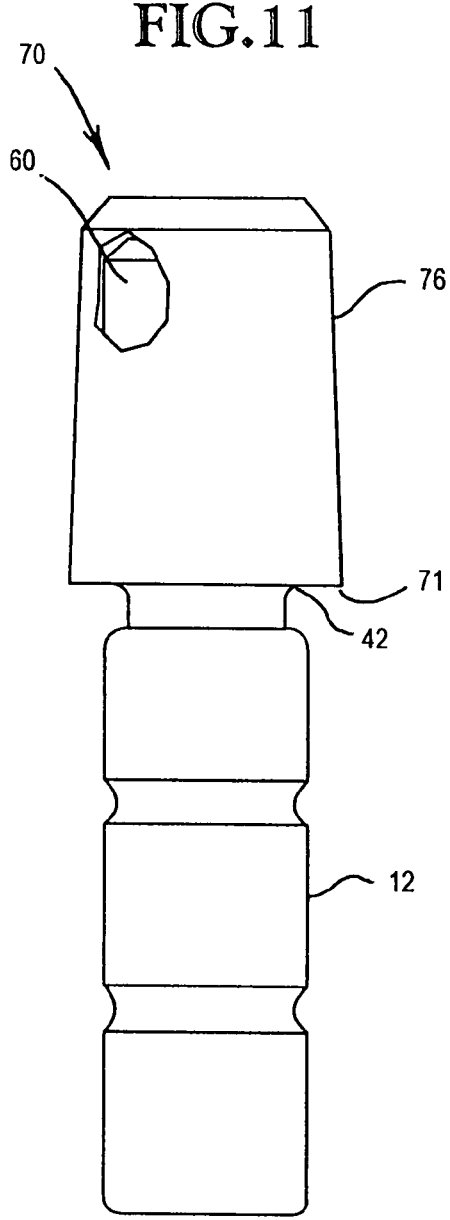
FIG. 11 is a view like FIG. 1, showing the edible fluid within the reservoir/handle, the body of hard candy on the tubular portion of the candy holder, and the cap extending over the body of candy and connecting to the base of the candy holder.
Figure 12:
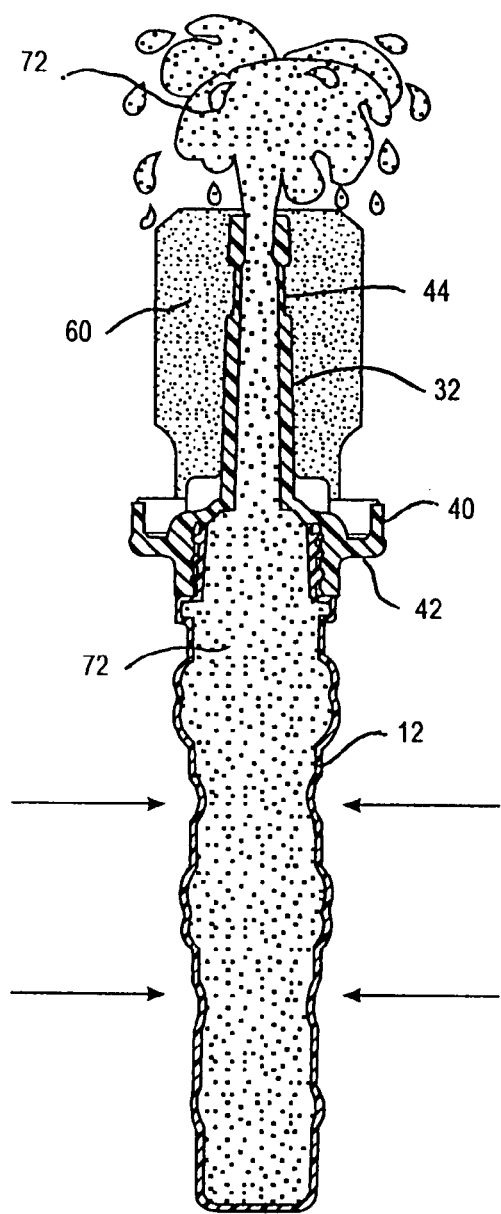
FIG. 12 is a view like FIG. 11 but with the cap removed and the reservoir/handle being squeezed for the purpose of displacing some of the edible fluid out from the reservoir/handle and through the passageway in the tubular portion of the candy holder.

The candy product 10 shown by FIGS. 1, 11 and 12, may be viewed as a type of "lollipop" or "sucker" it comprises a reservoir/handle 12 that is sized and shaped to be grasped by a consumer's hand. It includes a closed bottom wall 14, a closed sidewall 16, and an open upper end 18, FIGS. 9 and 10. U.S. Pat. No. 6,730,339 and pending application Ser. Nos. 10/242,198 and 10/647,150 illustrate additional forms of the reservoir/handle 12. The contents of this patent and these applications are hereby incorporated herein by this specific reference. The reservoir/handle 12 may also be referred to as a "container" because, as hereinafter will be described, it contains an edible fluid.

Preferably, the upper end of the container 12 is provided with a neck 20 which defines the open top 18. Neck 20 preferably includes external threads 22. Referring back to FIGS. 1, 11 and 12, the candy product 10 includes a holder 24 having a base 26 that includes a cup-shaped portion 28. Cup-shaped portion 28 is internally threaded and the threads are sized and shaped to mate with the external threads 22. A tubular member or stem 32 extends upwardly from the base 26. The tubular member 32 has two ends: a lower end which is attached to the container 12 by way of the cup-shaped portion 28 and the threads 22, and an upper end 50. The tubular member includes an interior passageway 34 which terminates in an opening 36 at the upper end 50 of the tubular member. The lower end 38 of the interior passageway 34 communicates with the interior of part 28. Base 26 also includes a cylindrical wall 40 that is concentric with the tube 32 and the central base portion 28. A radial wall, i.e., a flange 42, may extend between central portion 30 and peripheral portion 40. The peripheral portion 40 is a cylindrical shell joined to the flange 42 at the flange periphery and coaxial with the tubular member. Stem 32 may include a peripheral indentation 44 for purposes that will hereinafter be described.

FIGS. 3 and 5-7 show a pin 46 that forms a function during the manufacture of the candy product 10. Pin 46 is connected to the handle 48 and it extends away from the handle 48 in the manner shown by FIGS. 2, 3 and 5-7.

Figure 6:
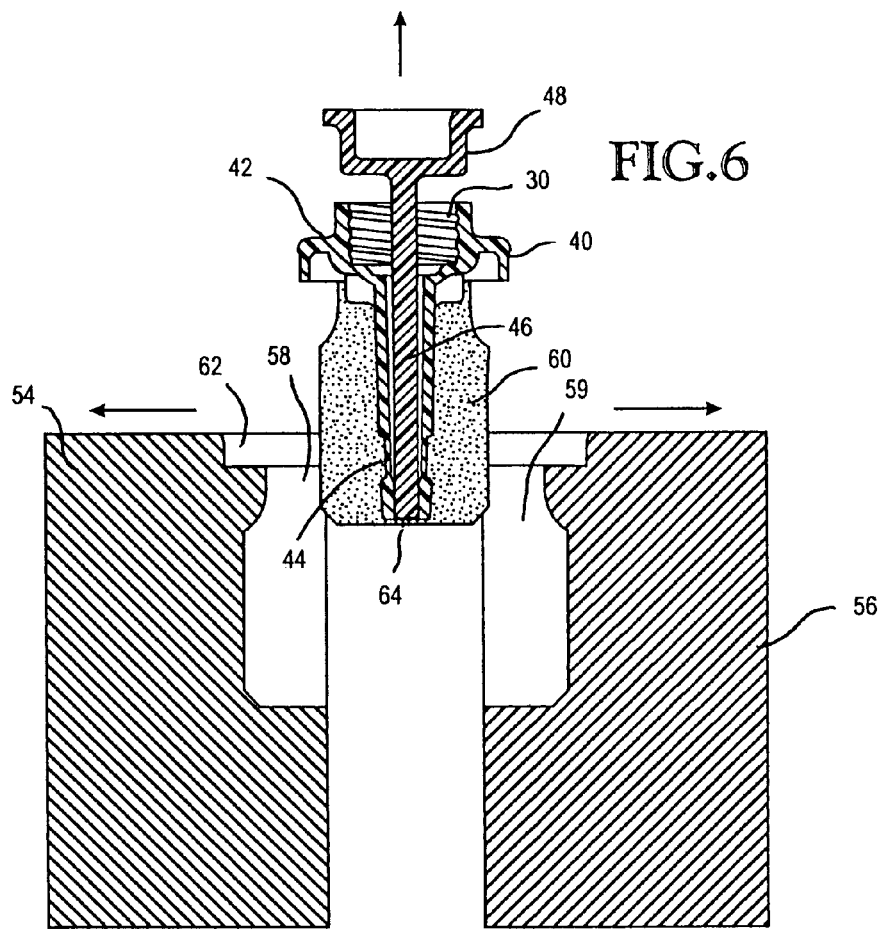
FIG. 6 is a view like FIG. 5, but showing the two parts of the mold separated and the candy holder and body of solid candy on the candy holder being removed from the mold.
Figure 7:
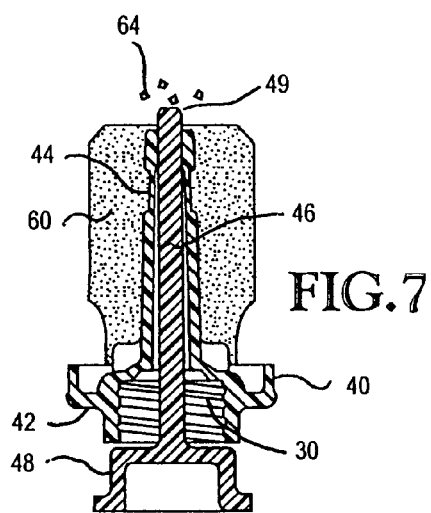
FIG. 7 is a longitudinal sectional view of the candy holder and the pin, such view showing the pin being moved through the passageway for breaking loose a wall of candy that was formed over the outer end of the tubular portion of the candy holder.

The method of manufacturing the candy product 10 will now be described with reference to FIGS. 3-11. Firstly, the pin 46 is inserted into the passageway 34 in the manner shown by FIG. 3. When the pin 46 is installed, its upper end 48 is substantially flush with the upper end 50 of the passageway 32. As shown by FIGS. 4-6, a sectional mold 52 is provided. It may comprise first and second parts 54, 56 which together define a mold cavity 58, 59. When the two parts 54, 56 are together, a fluid candy product 60 is introduced into the mold cavity 58, 59 through its upper end. This upper end may be surrounded by a trepan 62 that is sized and shaped to receive the base portion 26 of the holder 24 when it is in an inverted position as shown by FIG. 5. After the fluid candy product 60 is introduced into the mold cavity 58, 59, the assembly of the holder 24 and the pin 46 is inverted and inserted downwardly into the body of candy 60. When the base 26 is within the trepan 62, the ends 48, 50 of the pin 46 and tubular passageway 32 are substantially at the bottom of the mold cavity, as also shown by FIG. 5. The fluid candy substance 60 hardens after awhile and adheres itself to the tubular member 32. Indentation 44 receives some of the candy 60 and helps lock the candy 60 to the stem 32. Some of the candy enters the recess 44 and serves to lock the candy member 60 that is formed onto the passageway 32. Following sufficient hardening of candy 60, the mold parts 54, 56 are separated and the assembly 32, 46 with the candy body 60 attached, is removed from the mold cavity 58. As shown by FIG. 6, a film or wall of candy 64 may have been formed over the end of tubular passageway 32. As shown by FIGS. 5 and 6, the base 48 of the pin 46 is spaced above its end of the holder 24 when the end 48 of pin 46 is substantially flush with the end 50 of tubular passageway 32. This arrangement provides for axial movement of the pin assembly 46, 48 further into the passageway 32. As shown by FIG. 7, the member 46, 48 is pushed further through the tubular passageway 32 so that the end 49 of pin 46 will break loose the thin candy layer or wall 64 so that the end 50 of the tubular stem 32 becomes open. At this stage, the pin assembly 46, 48 is no longer needed in the manufacturing process. It is withdrawn from the tubular passageway 32, leaving the candy product 10 with a center opening at its end that is clear of candy.

Figure 8:
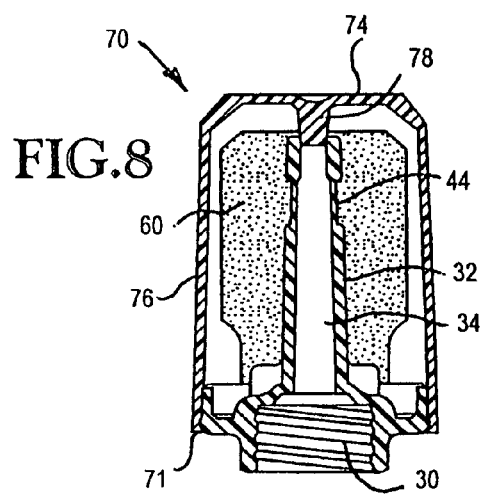
FIG. 8 is a view like FIG. 7, but with the pin removed and showing a cap secured to the candy holder, such view showing a plug extending from the end wall of the cap into the passageway in the tubular portion of the candy holder.

According to the invention, the hardened body of candy 60 is provided with a cap or cover 70 having an open end 71, a closed end 74, a closed sidewall 76 and a plug 78 that extends axially into the cap or cover 70 to the end wall 74. As shown by FIG. 8, the cap or cover 70 is sized and dimensioned so that when it is installed over the body of candy 60, its open end 71 will frictionally engage the outer surface of peripheral wall 40 and the plug 78 will enter into the end portion of the tubular passageway 32.

Referring to FIGS. 1 and 9-12, an edible fluid 72 is introduced into the container or reservoir/handle 12, through its open end. The edible fluid 72 may also be a candy and it does not harden but rather remains in a fluid state, either as a liquid or a gel. When sufficient edible fluid 72 is within the container 12, the assembly 24, 60, 76 is connected to the reservoir/handle 12 by use of the mating threads 22, 30. When the assembly 24, 32, 60 is connected to the reservoir/handle 12, the member 76 serves as a cover or cap for the hard candy body 60. Also, the plug 78 prevents the flow of the edible fluid 72 out from the container 12 by way of the tubular passageway 32.

FIGS. 1 and 11 show the candy product 10 in the commercial form that is offered to consumers. It is ready to be enjoyed by a consumer in the following manner. The cap or cover 76 is removed by merely pulling it off of the cylindrical wall 40 that is at the base of the holder 24. This removes the cap/cover 76 from over the hard candy body 60 and removes the plug 78 from the top portion of the tubular stem 32. This enables the consumer to lick or suck on the hard candy body 60, as he/she would lick or suck a conventional lollipop. Also, the reservoir/handle 12 can be squeezed (FIG. 12) for the purpose of expressing some of the edible fluid 72 out from reservoir or container, through the tubular stem 32, and into the consumer's mouth. If the consumer desires to stop consumption while there is some hard candy 60 and/or edible fluid 72 present, the consumer can reinstall the cover or cap 70. This places the plug 78 back in the hollow stem 32 and closes off the exit of edible fluid 72 out from the reservoir/handle 12. It also encloses the hard candy body 60 so that it is protected from the elements. The consumer is then able to place the candy product 10 in a pocket, purse, or the like, without the hard candy body 60 becoming dirty and without leakage of the edible fluid 72 out from the container 12.

The illustrated embodiment is only an example of the present invention and, therefore, is non-limitive. It is to be understood that many changes in the particular structure, materials and features of the candy product may be made without departing from the spirit and scope of the invention. Therefore, it is my intention that my patent rights not be limited by the particular embodiment that is illustrated and described herein, but rather is to be determined by the following claims, interpreted according to accepted doctrines of patent claim interpretation.

What is claimed is:

1. A candy product, comprising:
    a container containing an edible fluid;
    an elongated tubular member having a first end attached to the container and a second end at which an outlet resides, said elongated tubular member having a flange extending radially outwardly therefrom and a cylindrical shell at the periphery of said flange, said cylindrical shell being coaxial with said elongated tubular member and having an outer surface;
    a solid body of candy surrounding said elongated tubular member; and
    a cover for said solid body of candy including an open end, a closed end, and a sidewall between said closed end and said open end, said closed end including a plug insertable into said second end of the tubular member when said cover is installed, and said sidewall engaging the outer surface of said cylindrical shell;
    whereby when the cover is removed, edible fluid can flow outwardly from the container to and through the elongated tubular member, and when the cover is installed, over the solid body of candy, the plug is inside of and forms a closure for the outlet end of the elongated tubular member.

2. The candy product of claim 1, wherein the container is shaped and sized to be received within a consumer's hand, to serve as a handle for the candy product.

3. The candy product of claim 2, wherein the flange extends from a base member that is connected to an outlet for said container.

4. The candy product of claim 3, wherein the base member includes an opening with internal threads and the container has external threads for receiving the internal threads, whereby the base member can be screwed onto the container.

* * * * *